(12) United States Patent
Slavin

(10) Patent No.: US 8,624,561 B1
(45) Date of Patent: Jan. 7, 2014

(54) POWER CONVERSION HAVING ENERGY STORAGE WITH DYNAMIC REFERENCE

(75) Inventor: Keith Slavin, Beaverton, OR (US)

(73) Assignee: SolarBridge Technologies, Inc., Austin, TX (US)

( * ) Notice: Subject to any disclaimer, the term of this patent is extended or adjusted under 35 U.S.C. 154(b) by 438 days.

(21) Appl. No.: 12/940,068

(22) Filed: Nov. 5, 2010

Related U.S. Application Data

(60) Provisional application No. 61/290,821, filed on Dec. 29, 2009.

(51) Int. Cl.
*H02J 7/00* (2006.01)
*H02M 3/06* (2006.01)

(52) U.S. Cl.
USPC ........... 320/166; 320/101; 320/135; 320/139; 136/291; 323/234; 307/109

(58) Field of Classification Search
USPC ........................................................ 320/166
See application file for complete search history.

(56) References Cited

U.S. PATENT DOCUMENTS

| | | | | |
|---|---|---|---|---|
| 5,357,419 A | * | 10/1994 | Limpaecher | 363/140 |
| 5,598,326 A | * | 1/1997 | Liu et al. | 363/34 |
| 5,677,833 A | * | 10/1997 | Bingley | 363/71 |
| 6,462,976 B1 | * | 10/2002 | Olejniczak et al. | 363/147 |
| 6,713,890 B2 | * | 3/2004 | Kondo et al. | 290/40 B |
| 6,800,964 B2 | * | 10/2004 | Beck | 307/126 |
| 2006/0043954 A1 | * | 3/2006 | Markowski | 323/283 |
| 2007/0159866 A1 | * | 7/2007 | Siri | 363/95 |

* cited by examiner

*Primary Examiner* — Yalkew Fantu
(74) *Attorney, Agent, or Firm* — Barnes & Thornburg LLP

(57) ABSTRACT

A power conversion system may include a controller to cause a power stage to control the flow of power to or from an energy storage device in response to a dynamic reference. The flow of power to or from the energy storage device may be controlled at a substantially higher speed than power fluctuations in a power source or load. In a power conversion system, a model including an energy storage device may be generated in real-time, and a condition of the energy storage device may be determined in response to the model.

22 Claims, 6 Drawing Sheets

POWER CONVERSION HAVING ENERGY STORAGE WITH DYNAMIC REFERENCE

CROSS-REFERENCE TO RELATED APPLICATIONS

This application claims priority from U.S. Provisional Patent application Ser. No. 61/290,821 filed Dec. 29, 2009, which is incorporated by reference.

BACKGROUND

Power converters are used to convert electric power from one form to another, for example, to convert direct current (DC) power to alternating current (AC) power. One important application for power converters is in transferring power from energy sources such as solar panels, batteries, fuel cells, etc., to electric power distribution systems such as local and regional power grids. Most power grids operate on AC current at a line (or mains) frequency of 50 or 60 cycles per second (Hertz or Hz). Power in an AC grid flows in a pulsating manner with power peaks occurring at twice the line frequency, i.e., 100 Hz or 120 Hz. In contrast, many energy sources supply DC power in a steady manner. Therefore, a power conversion system for transferring power from a DC source to an AC grid typically includes some form of energy storage to balance the steady input power with the pulsating output power.

This can be better understood with reference to FIG. 1 which illustrates the mismatch between a DC power source and a 60 Hz AC load. The amount of power available from the DC source is shown as a constant value at the center line of the sine wave. In contrast, the amount of power that must be transferred to the AC load is shown as a sine wave that fluctuates from the zero power level at the minimum of the sine wave to a maximum value and back down to minimum once every half line cycle. For a system with a grid frequency $f_{grid}$, a half line cycle is given by $1/(2*f_{grid})$, which is 10 milliseconds (ms) 50 Hz systems, and 8.33 ms for 60 Hz systems. During time T1, the power available from the DC source exceeds the instantaneous power required by the AC load. During time T2, however, the maximum power available from the DC source is less than that required by the load. Therefore, to effectively transfer power from the source to the load, the power conversion system must store the excess energy from the power source during time T1 (shown as the shaded area S), and discharge the stored energy to the load during time T2 (shown as the shaded area D).

FIG. 2 illustrates a conventional system for converting DC power from a photovoltaic (PV) panel to AC power. The PV panel 10 generates a DC output current $I_{PV}$ at a typical voltage $V_{PV}$ of about 35 volts, but panels having other output voltages may be used. A DC/DC converter 12 boosts $V_{PV}$ to a link voltage $V_{DC}$ of a few hundred volts. A DC/AC inverter 14 converts the DC link voltage to an AC output voltage $V_{GRID}$. In this example, the output is assumed to be 120VAC at 60 Hz to facilitate connection to a local power grid, but other voltages and frequencies may be used.

The system of FIG. 2 also includes a DC link capacitor $C_{DC}$ and a decoupling capacitor $C_1$. Either or both of these capacitors may perform an energy storage function to balance the nominally steady power flow from the PV panel with the fluctuating power requirements of the grid. Power ripple within the system originate at the DC/AC inverter 14, which must necessarily transfer power to the grid in the form of 120 Hz ripple. In the absence of a substantial energy storage device, this current ripple would be transferred all the way back to the PV panel where they would show up as fluctuations (or "ripple") in the panel voltage $V_{PV}$ and/or current $I_{PV}$. Therefore, the DC link capacitor $C_{DC}$, or less often, the decoupling capacitor $C_1$, is used to store enough energy on a cycle-by-cycle basis to reduce the ripple at the PV panel to an acceptable level.

Ripple on a link capacitor also affects the downstream operation of the system. FIG. 3 illustrates the instantaneous demand for voltage from an H-bridge type DC/AC inverter in comparison to the voltage available from a DC link capacitor that is maintained at a fixed voltage. As long as the DC link voltage is maintained above the peak voltage demand from the inverter (plus an extra amount for headroom), the inverter can produce the AC output with little or no harmonic distortion (HD) in the output voltage and current waveforms. Therefore, reducing ripple on the link capacitor is also beneficial from the perspective of the downstream operation of the system. The ripple can be reduced by using a larger capacitor, but increasing the size of a capacitor dramatically increases its cost.

Moreover, in conventional systems, energy storage capacitors tend to be problematic components for several reasons. First, a capacitor that is large enough to provide adequate energy storage must generally be of the electrolytic type, since other large capacitors are usually prohibitively expensive. Electrolytic capacitors, however, have limited life spans and tend to have a high failure rate. As a further complication, the capacitance of an electrolytic capacitor steadily decreases over its lifetime as the electrolyte dissipates and/or deteriorates, thereby reducing its effectiveness and changing the dynamics of the entire system. Further, electrolytic capacitors tend to be bulky, heavy and fragile, and have a large equivalent series resistance (ESR). Thus, the capacitor in a conventional power conversion system is often the weakest link.

In a relatively recent development, gains in reliability and other characteristics have been achieved by taking the opposite approach to sizing the link capacitor. See, e.g., U.S. Patent Application Publication Nos. 2010/0157638 and 2010/0157632 which are incorporated by reference. In such systems, rather than maximizing the size of the link capacitor to minimize the ripple, a smaller link capacitor is used, and the voltage on this capacitor is purposely allowed to vary over a relatively wide range as shown in FIG. 4. Relaxing the ripple voltage range in this manner may enable the size of the link capacitor to be reduced because the amount of energy stored in a capacitor is directly related to the voltage swing across the capacitor. This may also make it economically viable to use more reliable types of capacitors such as those having metal film or other non-electrolytic construction.

As long as the minimums in the voltage available from the link capacitor do not drop below the voltage demanded from the inverter, distortion in the output voltage and/or current from the inverter can be held to an acceptable level using advanced algorithms such as those disclosed in the U.S. patent application Publications referenced above.

FIG. 5 illustrates a prior art control loop for regulating the voltage on a link capacitor in a system having relaxed ripple voltage requirements. A control signal CTRL controls a power stage 16 which in turn causes a certain amount of ripple on a DC link capacitor 18. From the perspective of power flow, the power stage may be arranged before or after the link capacitor. From the perspective of the control loop, however, the power stage has a causal effect on the link capacitor voltage $V_{DC}$, which is filtered by a low-pass filter 20 to generate an average value $V_{AVE}$ that is compared to a reference signal REF at a nulling circuit 22 to generate the control signal CTRL.

The low-pass filter 20 has a cut-off frequency that is substantially lower than the ripple frequency of the DC link capacitor. For example, in a 60 Hz power system the capacitor experiences a 120 Hz ripple, so the cut-off frequency of the low-pass filter 20 may be set to about 240 Hz to filter out the harmonic distortion and provide a sine wave of 120 Hz.

The reference signal REF is applied as a fixed or slowly varying signal with a time constant that is longer than the time constant of the low pass filter. The control loop attempts to balance the input and output power by controlling the output power injected into the load to match the available input power. The power withdrawn from the link capacitor is controlled so as to maintain an average target voltage across the capacitor. This average is maintained by reducing or increasing the current out of the capacitor into the DC/AC inverter. The minimum voltage across the capacitor must always be greater than the grid voltage in order for the inverter circuit to work without distorting the power injection onto the grid. In addition, the maximum voltage across the capacitor must be less than the rated capacitor voltage, with some additional safety margin to increase reliability of the system. Thus, the control loop causes the link capacitor voltage to slide up and down on a pedestal, which is the average value $V_{AVE}$ of the link capacitor voltage, to satisfy the requirements for power balance, safety margin, etc.

A problem with the conventional approach is that the low-pass filter causes long delays in the feedback loop, so the system is slow to adapt to unpredictable changes in input power (e.g., solar) or output power (e.g., load connection/disconnection). If the capacitor voltage exceeds one of the safety margins, the input power may need to be switched off to avoid a capacitor overvoltage situation, or the load current may need to be reduced to avoid an under-voltage situation.

If power into the system increases suddenly, or the output load decreases (i.e. the inverter output is disconnected), the system cannot respond fast enough, so a fast capacitor over-voltage condition occurs. One conventional response to this potentially destructive situation is to implement a fast over-voltage protection system to protect the capacitor. This response, however, increases the cost of the system and can significantly increase power dissipated within the inverter if it is used frequently.

Another conventional response to a capacitor over-voltage condition is to completely switch off input power. Although this type of complete shut down typically takes longer to achieve, it can effectively neutralize an on-going uncorrectable power imbalance. However, switching off the power source may incur a large delay before power can be reapplied because the control loop cannot control a sudden application of input power due to its slow speed. Instead, a gradual power-up ramp is typically used. Moreover, in grid-tie inverter situations, once the inverter is disconnected from the grid, reconnection may require a mandatory waiting period of several minutes. This leads to reduced energy harvest from the power source such as a photovoltaic array.

Likewise, if the power into the system drops suddenly, or an output load increases, the slow response of the control loop causes a fast capacitor under-voltage condition to occur, thereby causing distortion of the power injected onto the grid. While such a situation is typically not critical, it may cause the inverter power injection distortion to be non-compliant with regulations if it happens too frequently.

In either case, greater DC link capacitor voltage margins may be used to compensate for the slow system response. However, this requires a DC link capacitor with a higher voltage rating which is more expensive. Higher DC link voltages may also increase the costs of other system components.

DETAILED DESCRIPTION

Figure 1:
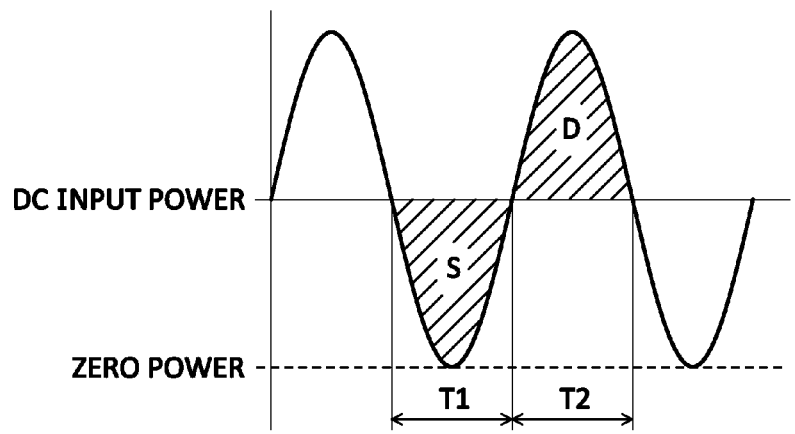
FIG. 1 illustrates the mismatch between a DC power source and an AC load.
Figure 2:
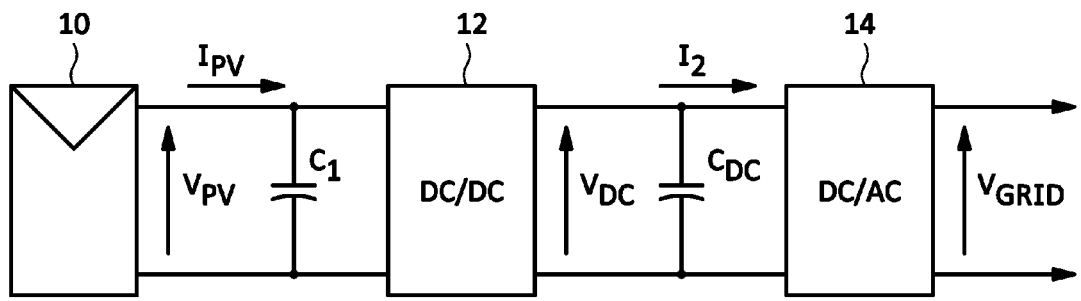
FIG. 2 illustrates a prior art system for converting DC power from a photovoltaic panel to AC power.
Figure 3:
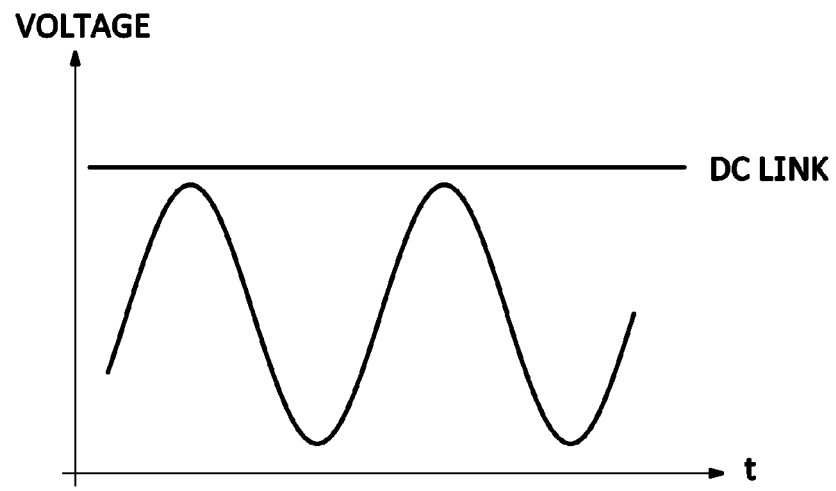
FIG. 3 illustrates the instantaneous demand for voltage from an inverter in comparison to the voltage available from a DC link capacitor that is maintained at a fixed voltage.
Figure 4:
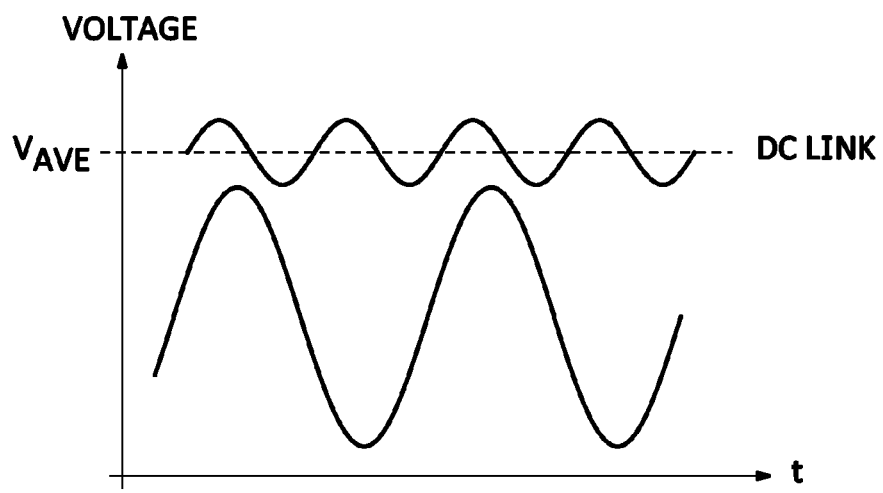
FIG. 4 illustrates instantaneous demand for voltage from an inverter in comparison to the voltage available from a DC link capacitor having relaxed operating conditions.
Figure 5:
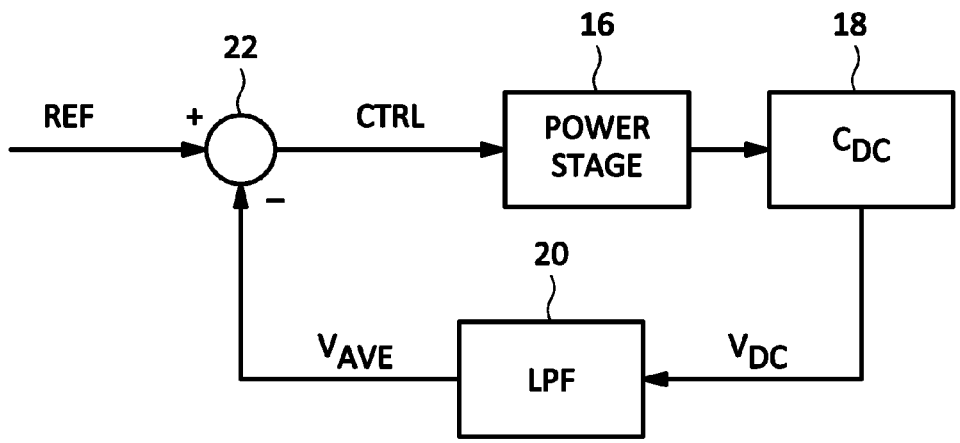
FIG. 5 illustrates a prior art control loop for regulating the voltage on a link capacitor in a system having relaxed ripple voltage requirements.
Figure 6:
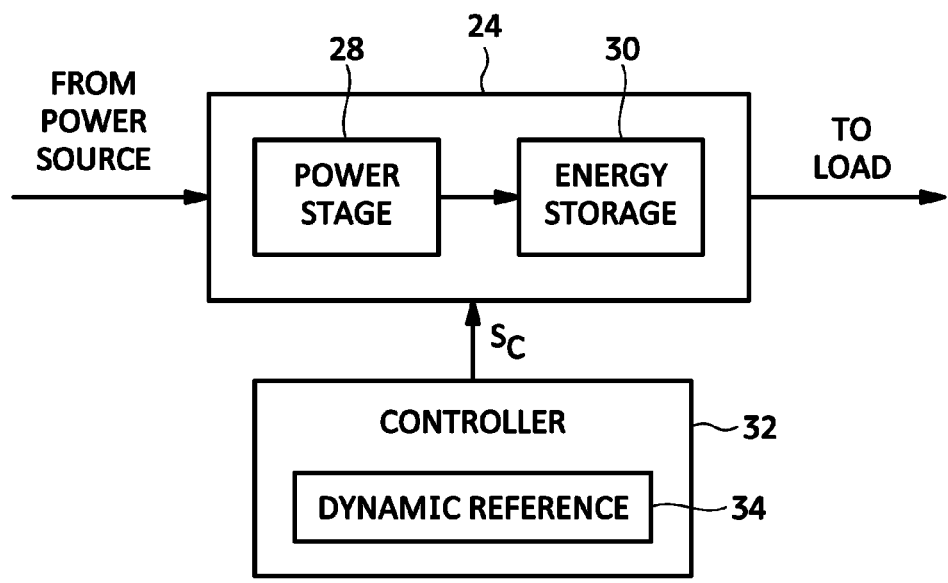
FIG. 6 illustrates an embodiment of a power conversion system according to some inventive principles of this patent disclosure.

FIG. 6 illustrates an embodiment of a power conversion system according to some inventive principles of this patent disclosure. The embodiment of FIG. 6 includes a power converter 24 to transfer power from a power source to a load. The converter 24 includes a power stage 28 and an energy storage device 30 arranged to balance the instantaneous power available from the power source with the instantaneous power demand of the load. A controller 32 generates one or more control signals $S_C$ that cause the power stage 28 to control the flow of power to the energy storage device in response to a dynamic reference 34.

Either the power source or the load may have substantial fluctuations, for example, if the power source is an AC source, or the load is an AC load. The power source may include a PV panel, fuel cell, battery, wind turbine, etc. The power stage 28 may include one or more DC/DC converters, DC/AC inverters, rectifiers, etc. The energy storage device 30 may include one or more capacitors, inductors, etc. The load may include an AC grid load, a motor, a purely resistive load, etc. In one example embodiment, the power source includes a PV panel, the power stage 28 includes a DC/DC converter, and the energy storage device 30 includes a link capacitor.

The controller 32 is arranged to control a parameter of the energy storage device in response to the dynamic reference 34. For example, the energy storage device may be a capacitor, and the parameter may be the voltage of the capacitor. The controller may generate the dynamic reference in response to a model of the energy storage device and the input and output power conditions. The dynamic reference may be generated internally or obtained externally by the controller. The flow of power to or from the energy storage device may be controlled at a substantially higher speed than the power fluctuations in the power source and/or energy storage device.

Figure 7:
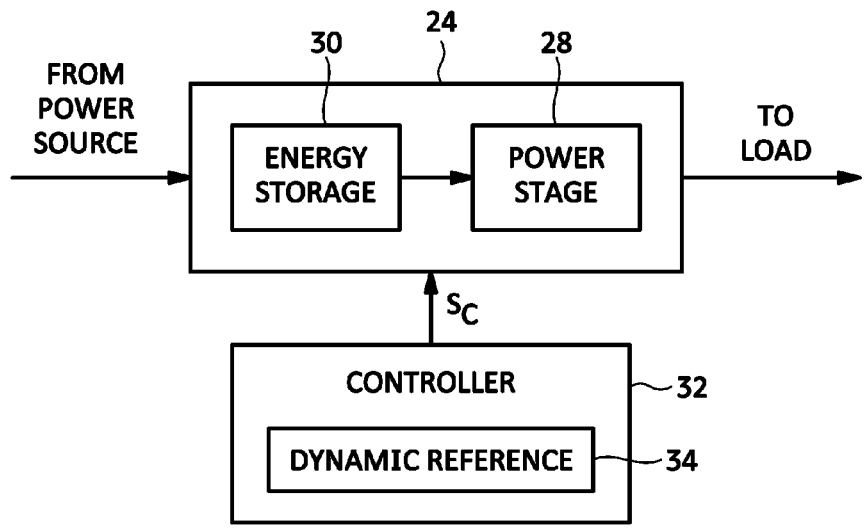
FIG. 7 illustrates another embodiment of a power conversion system according to some inventive principles of this patent disclosure.

FIG. 7 illustrates another embodiment of a power conversion system according to some inventive principles of this patent disclosure. The embodiment of FIG. 7 is similar to the embodiment of FIG. 6 except that the order of the power stage 28 and energy storage device 30 is reversed.

Figure 8:
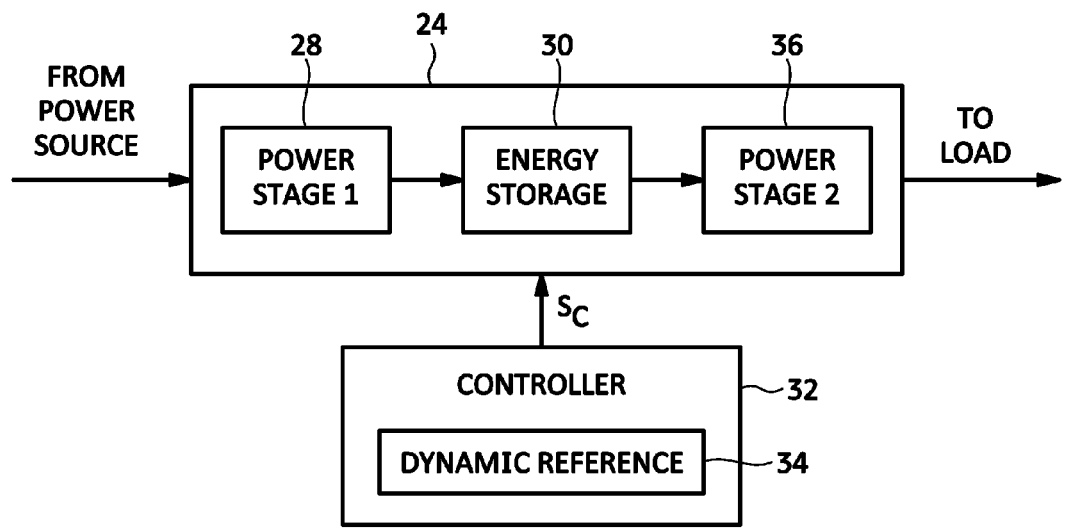
FIG. 8 illustrates another embodiment of a power conversion system according to some inventive principles of this patent disclosure.

FIG. 8 illustrates another embodiment of a power conversion system according to some inventive principles of this patent disclosure. The embodiment of FIG. 8 is similar to the embodiment of FIG. 6, but a second power stage 36 is included after the energy storage device 30. As with the first power stage 28, the second power stage 36 may include one or more DC/DC converters, DC/AC inverters, rectifiers, etc.

Figure 9:
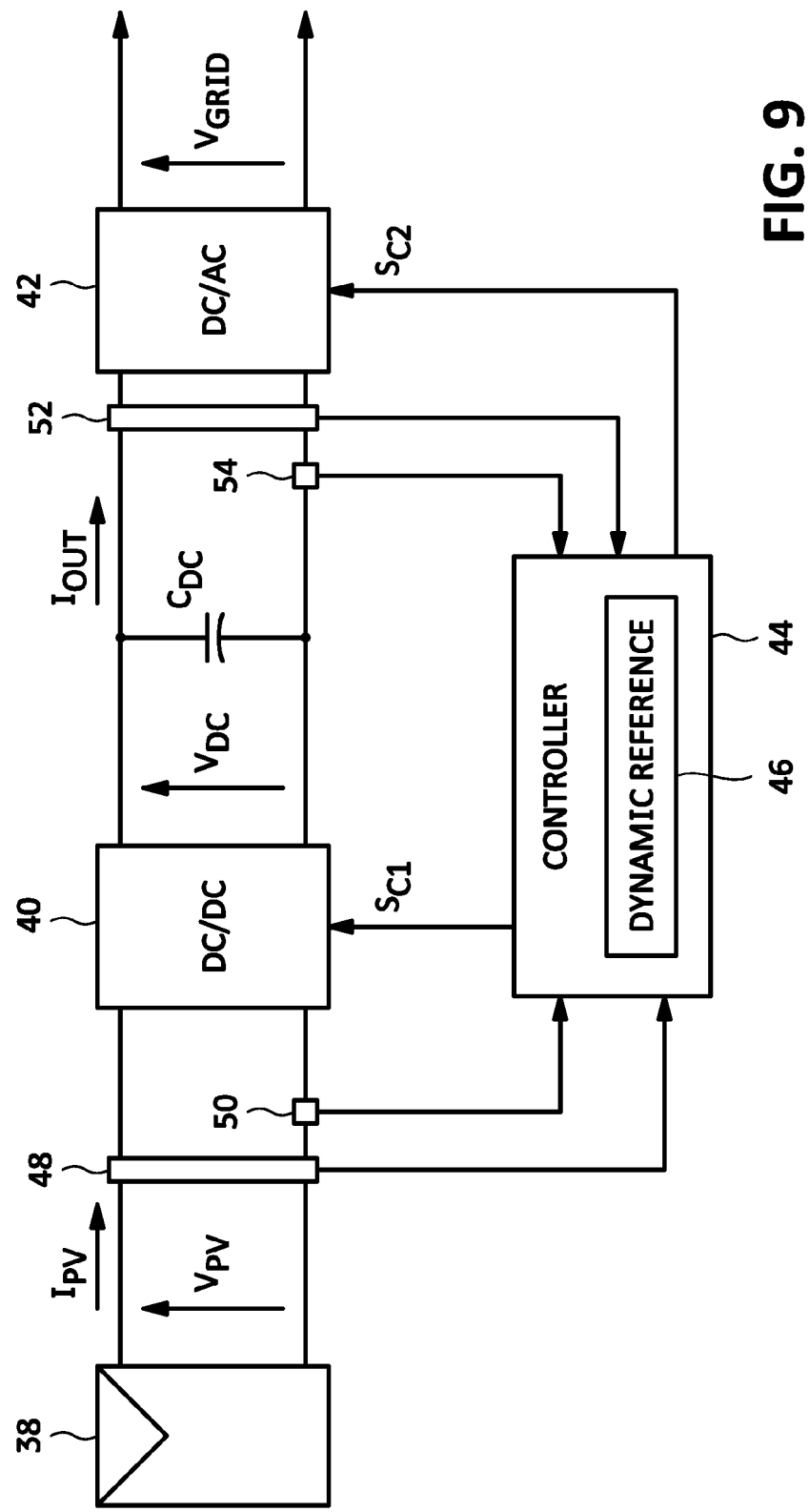
FIG. 9 illustrates some example implementation details of another embodiment of a power conversion system according to some inventive principles of this patent disclosure.

FIG. 9 illustrates another embodiment of a power conversion system according to some inventive principles of this patent disclosure. The embodiment of FIG. 9 illustrates some example implementation details in the context of an inverter system for connecting a photovoltaic (PV) power source to a grid, but the inventive principles are not limited to these specific details.

The system of FIG. 9 receives power from photovoltaic cells in a PV panel 38. The system includes a DC/DC converter 40, a link capacitor $C_{DC}$, a DC/AC inverter 42, and a controller 44 that operates in response to a dynamic reference 46. The DC/DC converter may include one or more stages such as buck converters, boost converters, push-pull stages, rectifiers, etc., arranged as pre-regulators, main stages, etc. The DC/AC inverter 42 may include any suitable inverter topology such as an H-bridge with a buck front end, a resonant inverter, etc. Voltage and current sensors 48 and 50 provide signals indicating the PV panel output voltage $V_{PV}$ and current $I_{PV}$, respectively, to the controller 44. Voltage and current sensors 52 and 54 provide signals indicating the link voltage $V_{DC}$ and output current $I_{OUT}$, respectively. The controller outputs a first control signal $S_{C1}$ to control the DC/DC converter 40, and a second control signal $S_{C2}$ to control the DC/AC inverter 42.

Controller 44 implements a control algorithm with a much shorter time response in the control loop compared to the line cycles of the grid. This may be achieved by generating a dynamic internal reference voltage (or digital representation of that voltage) that indicates what the capacitor voltage should be given the known value of the link capacitor, and the known input and output power conditions. For example, in a 60 Hz power conversion system, the dynamic reference signal may be implemented as a 120 Hz waveform that defines the optimum values of the link capacitor voltage during each line cycle.

The flow of power onto the grid or from the PV panel may then be controlled so that the unfiltered capacitor voltage follows this reference using a control loop that may have a much faster response time compared to the line cycles of the grid. The generation of the internal reference may be much more complex than in a conventional system, but is readily implementable on a modern digital signal processor (DSP). In essence, the system may be modeled in real-time, and the model may serve as the basis for generating the dynamic reference signal.

This fast response time allows the system to adapt to changing loads or input power much more rapidly, reducing the rate of under-voltage or over-voltage events, and resulting in a more robust system without the use of a higher voltage link capacitor than is strictly necessary. While a capacitance over-voltage protection system may still be useful for safety, it may be less frequently needed.

Furthermore, it is possible to generate sinusoidal margins of safety within which the DC link capacitor voltage is supposed to lie, and in which normal feedback control is applied. If the capacitor voltage goes outside these limits, then more drastic action can be taken.

For example, if the capacitor voltage goes above the upper sinusoidal voltage limit, but is not already above the normal working voltage limit of the capacitor, then the system can proceed to dump more current into the load, if possible. This may distort the current injection into the grid, but only temporarily until normal control operation is restored. This reduces the probability of frequently dissipating excessive power into the capacitor system.

Similarly, if the capacitor voltage falls below the lower limit sinusoid, but is not already at the grid voltage, then the system can immediately start to reduce injected power in a more gradual manner, rather than hitting the hard limit where the capacitance voltage equals the grid voltage (producing more severe injection distortion).

In practice, the bandwidth of the DC link capacitor voltage control loop can be reduced to suit the available processing power in the DSP. A lower bandwidth reduces compute load at the expense of responsiveness, allowing the designer to trade off compute power and responsiveness to external power events. For example, a system may have 100 KHz sampling, and filtering down to 3 KHz sampling for the control loop, which may provide much better performance than the 120 Hz response dictated by conventional systems.

Some example implementation details are provided in the APPENDIX, but the inventive principles are not limited to these details.

Some additional inventive principles relate to the use of real-time modeling of one or more system components to determine a condition of the component, and then take one or more actions based on the condition. For example, in the example embodiment illustrated above with respect to FIG. 9, as the capacitor ages, the value of the capacitor gradually decreases and the voltage swing across the capacitor increases accordingly. The system model enables the value of the link capacitor to be determined by monitoring these small changes over time.

If the capacitance deteriorates to a point that the system may no longer operate efficiently or effectively, the condition of the capacitor may be reported to a gateway or centralized control center using power-line communications, dedicated communication lines, wireless communications, or any other suitable form of communication. If the capacitance further deteriorates to a point that continued operation may pose a risk of damage, corrective action may be taken such as reducing the operating power level or disabling the system entirely.

Figure 10:
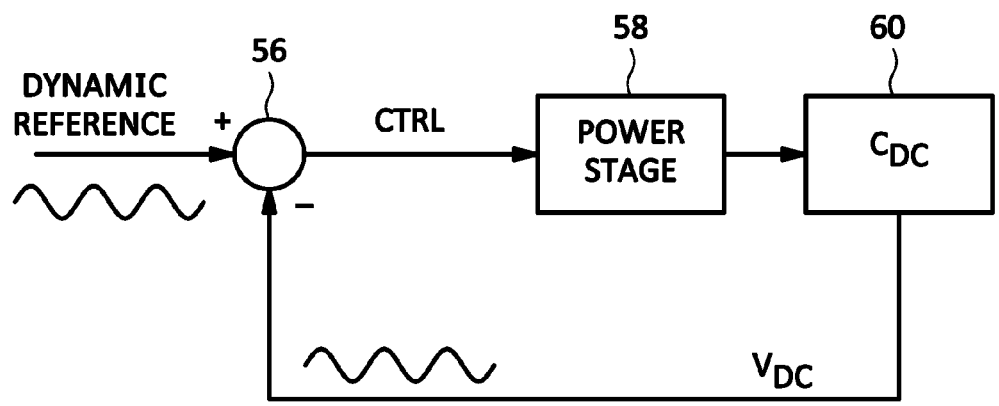
FIG. 10 illustrates an embodiment of a control loop for regulating the voltage on a link capacitor according to some inventive principles of this patent disclosure.

FIG. 10 illustrates an embodiment of a control loop for regulating the voltage on a link capacitor according to some inventive principles of this patent disclosure. The embodiment of FIG. 10 may be implemented, for example, using any of the systems of FIGS. 6-9. In the system of FIG. 10, the dynamic reference signal is compared by nulling circuit 56 to the substantially unfiltered feedback signal $V_{DC}$ from a DC link capacitor 60 or other energy storage device. The resulting control signal CTRL is used to control one or more power stages 58 which control the flow of power to the energy storage device.

The inventive principles relating to determining and/or reporting conditions of system components are independent of the principles relating to dynamic references. For example, the inventive principles may implemented in a conventional centralized inverter to monitor and report the condition of one or more electrolytic capacitors, thereby enabling more efficient maintenance of inverter systems. This may eliminate the need for periodic manual checks on the condition of electrolytic capacitors, as well as eliminate failures due to unanticipated or unmonitored capacitor degradation.

The inventive principles of this patent disclosure have been described above with reference to some specific example embodiments, but these embodiments can be modified in arrangement and detail without departing from the inventive concepts. Such changes and modifications are considered to fall within the scope of the following claims.

APPENDIX

For DC link capacitance C with voltage Vc and input current Ic, Vc(t) essentially becomes the dynamic reference to which the capacitor voltage is controlled. The charge/discharge during inverter operation is given by:
1) (power_in(t)−power_out(t))/Vc(t)=Ic=C*dVc(t)/dt
With voltage on the output related to the peak voltage:
2a) V(t)=Vpk*sin (w*t)
(where Vpk=sqrt(2)*Vrms) and in-phase current related to the peak current:
2b) I(t)=Ipk*sin(w*t)
provides the following:
3) power_out(t)=Vpk*Ipk*sin (w*t)Λ2=Vpk*Ipk*(1− cos (2*w*t))/2
and the average of power in=average of power out. The average input power (which depends on panel illumination) is given by the DC term above:
4) avg_RMS_power=Vpk*Ipk/2=avg_power_in
so that
5)    avg_power_in−power_out(t)=avg_RMS_power*cos (2*w*t)
and therefore:
6) avg_RMS_power*cos(2\*w*t)=C*Vc*dVc/dt
Solving the above differential equation gives:
7) Vc(t)=sqrt(K^2+avg_RMS_power/(w*C)*sin(2*w*t))
where K is the RMS value of Vc(t). Defining a quantity A proportional to voltage (note: power=energy/sec=½*C*V^2) gives:
8) A^2=avg_RMS_power/(w*C)=Vpk*Ipk/(2*w*C)
and from (7):
9) Vc(t)=sqrt(K^2+A^2*sin(2*w*t))
Max(Vc(t)) and Min(Vc(t)) can be measured over one complete sin( )cycle (w can be measured by other means, or by asuming a 60 Hz or 50 Hz system), so:
10) Max^2=K^2+A^2
and
11) Min^2=K^2−A^2
and therefore:
12) K^2=(Max^2+Min^2)/2
and
13) A^2=(Max^2−Min^2)/2
If the average value of Vc(t)^2 is measured over exactly one cycle (t=Pi/w), K^2 can be obtained to a higher degree of accuracy.

The bridge voltage is the absolute magnitude of the output voltage (2a):
14) Vb(t)=Abs(V(t))
so maintaining a+ve voltage difference between Vb(t) and Vc(t) is necessary for correct operation for all t. Therefore
15) f(t)=sqrt(K^2+A^2*sin(2*w*t))−Vb(t)>=0
K=Kmin must be found such that f(t)>0 for all t.
Note that Vb(t)*sin(w*t) is maximum in the first half of the sine, so from (2a) the more analytical form:
16) Vb(t)=Vpk*sin(w*t)
can be used instead of Abs(V(t)) in (14). Then:
17) f(t)=sqrt(Kmin^2+A^2*sin(2*w*t))−Vpk*sin(w*t)

which must be >=0 for all t. The two right-hand terms are both sinusoidal, with a fixed phase relationship, so for constant power in, a solution can be found for all t by examining one cycle of sin(w*t). Assuming f(t)=0 at Kmin:
18) sqrt(Kmin^2+A^2*sin(2*w*t))=Vpk*sin(w*t)
so that
19) Kmin^2+A^2*sin(2*w*t)=Vpk^2*sin(w*t)^2
and therefore
20) Kmin^2=Vpk^2*sin(w*t)^2−A^2*sin(2*w*t)
Using the identity sin(x)^2=(1− cos(2*x))/2:
21) Kmin^2=Vpk^2*(1− cos(2*w*t))/2−A^2*sin(2*w*t)
Differentiation (19) with respect to t and equating to zero to find a maxima/minima:
22) A^2*2*w*cos(2*w*t)=Vpk^2*2*sin(w*t)*w*cos(w*t)
Cancelling w and using sin(2x)=2*sin(x)*cos(x):
23) 2*A^2*cos(2*w*t)=Vpk^2*sin(2*w*t) so that:
24) tan(2*w*t)=2*A^2/Vpk^2 and therefore:
25) cos(2*w*t)=Vpk^2/sqrt(Vpk^4+4*A^4)
and
26) sin(2*w*t)=2*A^2/sqrt(Vpk^4+4*A^4)
Substituting these into (21):
27)    Kmin^2=Vpk^2/2−(Vpk^4/2+2*A^4)/sqrt(Vpk^4+4*A^4)
which simplifies to:
28) Kmin^2=Vpk^2/2−sqrt(Vpk^4+4*A^4)/2
Now sqrt(Vpk^4+4*A^4) is always >Vpk^2 for real values, so taking the negative root of (28) gives:
29) Kmin^2=(Vpk^2+sqrt(Vpk^4+4*A^4))/2
which is independent of w and t.

Vpk is fairly constant (grid peak voltage), and A is invariant over the long term, even though it depends upon Ipk (8) which depends on solar panel output power. Therefore Kmin can be fairly reliably calculated. As K is measured, an extrapolation can be performed to guess whether K<Kmin occurs. If it does not occur, then there is no voltage to drive the output, which may then become distorted. In this case Vc must begin to be increased early to avoid this possibility. This is accomplished by reducing Ipk (2b) to reduce power_out over the next cycle (3). This reduces power_out in (1), which if, over one power cycle of sin(2*w*t), is less than avg_power_in. This causes dVc(t)/dt to be positive, which increases Vc(t).

Because A is a function of steady state RMS power (from the solar panels), and K is not determined by power levels, but is changed by the average energy stored in the capacitor, K needs to be recalculated for long term stability in a phase-locked loop. However, as Ipk is modified to do this, A (8) can be temporarily changed:
30) d(A^2)=Vpk*dI/(2*w*C)
Considering energy in C, if Ipk is at energy equilibrium, then K^2 changes by:
31) C/2 d(K^2)=(power_in−Vpk*Ipk/2)*t=−Vpk*dI/2*pi/w
in one power cycle (t=pi/w) period. Therefore
32) d(K^2)=−Vpk*dI*pi/(w*C)
This effect dominates (30), so the non-cumulative changes in A can be ignored. Therefore if:
33) Ipk+=dI
does an update on Ipk each power cycle, then from (32):
34) dI=(K^2−Kcenter^2)*w*C/(Vpk*pi) should give stability as a feedback loop. Kcenter can be chosen as
35) Kcenter^2=(Kmin^2+Kmax^2)/2
where Kmin^2 is from (29), and from (8),(10):
36) Kmax^2=Vmax^2−A^2
where Vmax is the maximum allowable voltage across the capacitor. Kcenter therefore depends on reasonably well known constants, Vmax, Vpk (29), average input power (4,8), w (8), and C (8). See the example below.

The voltage-squared terms are used (Energy) because an equal likelihood of Ipk (power) being above or below the point of power equilibrium can be assumed. This provides an equally large guard band either side of Kcenter, allowing the PLL as much time as possible to compensate for solar input variations and load (output power) variations.

For example:
Vmax=600V
Power_in =240W
C=10 uF=1e-5F
f=60 Hz
Vrms=240V
so
w=2*pi*f=376.991
A^2=Power in/(w*C)=63661.977 (4),(8)
Kmax^2=Vmax^2−A^2=360000−63661.978=296338.023
Vpk=sqrt(2)*Vrms=339.411
Kmin^2=(Vpk^2+sqrt(Vpk^4+4*A^4))/2=143452.241
Kcenter^2=(Kmin^2+Kmax^2)/2=219895.132
so
Kcenter=468.93 Volts

The invention claimed is:

1. An inverter to convert a direct current (DC) power from a DC source to an alternating current (AC) power, the inverter comprising:
a DC link capacitor;
an input stage electrically coupled to the DC link capacitor, the input stage configured to be electrically coupled to the DC source to receive a DC input power therefrom and generate a DC output waveform;
an output stage electrically coupled to the DC link capacitor and configured to convert the DC output waveform to an AC output waveform; and
a controller electrically coupled to the input stage and the DC link capacitor, the controller configured to:
(i) generate a dynamic reference signal as a function of a model of the DC link capacitor,
(ii) generate a control signal as a function of the dynamic reference signal and a measurement signal indicative of an operational parameter of the DC link capacitor, and
(iii) control the input stage using the control signal to control a flow of power to the DC link capacitor.

2. The inverter of claim 1, wherein the model of the DC link capacitor is a function of a reference capacitance value of the DC link capacitor.

3. The inverter of claim 2, wherein the controller is further configured to determine the present capacitance value of the DC link capacitor based on the operational parameter of the DC link capacitor and the dynamic reference signal.

4. The inverter of claim 3, wherein the controller is further configured to:
determine a difference between the reference capacitance value of the DC link capacitor and the present capacitance value of the DC link capacitor, and
generate an alert in response to the difference being greater than a threshold amount.

5. The inverter of claim 4, wherein to generate the alert comprises to transmit a report indicating a condition of the DC link capacitor.

6. The inverter of claim 5, wherein the report includes the present capacitance value of the DC link capacitor.

7. The inverter of claim 5, wherein to transmit the report comprises to transmit the report using power-line communications.

8. The inverter of claim 4, wherein to generate the alert comprises to generate an alert in response to the difference being greater than a first threshold, and wherein the controller is further to:
control operation of the input stage in response to the difference being greater than a second threshold that is greater than the first threshold.

9. The inverter of claim 8, wherein the control is further to disable at least one of the input stage and the output stage in response to the difference being greater than the second threshold.

10. The inverter of claim 1, wherein to generate the dynamic reference signal comprises to generate a dynamic reference signal as a function of the model of the DC link capacitor, the DC input power of the input stage, and a DC input power of the output stage.

11. The inverter of claim 1, wherein to generate the control signal comprises to generate a control signal based on a difference between the dynamic reference signal and the measurement signal.

12. The inverter of claim 1, wherein the dynamic reference signal is a voltage signal and the operational parameter is a voltage of the DC link capacitor.

13. The inverter of claim 1, wherein to control the input stage comprises to control the operational parameter of the DC link capacitor toward the dynamic reference signal.

14. A method for controlling a direct current-to-alternating current (DC-to-AC) inverter, the DC-to-AC inverter including a DC link capacitor, an input stage electrically connected to the DC link capacitor, and an output stage electrically connected to the DC link capacitor, the method comprising:
generating, by a controller of the DC-to-AC inverter, a dynamic reference signal as a function of a model of the DC link capacitor;
generating, by the controller, a control signal as a function of the dynamic reference signal and a measurement signal indicative of an operational parameter of the DC link capacitor, and
controlling, by the controller and using the control signal, the input stage of the inverter to control a flow of power to the DC link capacitor.

15. The method of claim 14, wherein generating the dynamic reference signal comprises generating a dynamic reference signal as a function of a model of the DC link capacitor based on a reference capacitance value of the DC link capacitor.

16. The method of claim 15, further comprising determining the present capacitance value of the DC link capacitor based on the operational parameter of the DC link capacitor and the dynamic reference signal.

17. The method of claim 16, further comprising:
determining a difference between the reference capacitance value of the DC link capacitor and the present capacitance value of the DC link capacitor, and
generating an alert in response to the difference being greater than a threshold amount.

18. The method of claim 17, wherein generating the alert comprises transmitting a report indicating a condition of the DC link capacitor.

19. The method of claim 18, wherein transmitting the report comprises transmitting the report using power-line communications.

20. The method of claim 17, wherein generating the alert comprises generating an alert in response to the difference being greater than a first threshold, and wherein the method further comprises:

disabling at least one of the input stage and the output stage in response to the difference being greater than a second threshold that is greater than the first threshold.

21. The method of claim 14, wherein:

generating the dynamic reference signal comprises generating a dynamic reference voltage signal, and generating the control signal comprises generating the control signal as a function of the dynamic reference voltage signal and a measurement signal indicative of a voltage of the DC link capacitor.

22. A system comprising:

a photovoltaic panel configured to generate a DC power output a DC-to-AC inverter comprising:
  a DC link capacitor;
  an input stage having an input electrically coupled to the photovoltaic panel to receive the DC power output therefrom and an output electrically coupled to the DC link capacitor;
  an output stage having an input electrically coupled to the DC link capacitor;
  a first voltage sensor configured to generate a first voltage signal indicative of an input voltage of the input stage;
  a first current sensor configured to generate a second current signal indicative of an input current of the input stage;
  a second voltage sensor configured to generate a second voltage signal indicative of a voltage of the DC link capacitor;
  a second current sensor configured to generate a second current signal indicative of an output current; and
  a controller electrically coupled to the input stage and configured to:
    (i) generate a dynamic reference voltage signal as a function of a model of the DC link capacitor, the first voltage signal, the first current signal, the second voltage signal, and the second current signal,
    (ii) generate a control signal as a function of the dynamic reference voltage signal and a measurement signal indicative of the voltage of the DC link capacitor, and
    (iii) control the input stage using the control signal to control a flow of power to the DC link capacitor.

\* \* \* \* \*

UNITED STATES PATENT AND TRADEMARK OFFICE
CERTIFICATE OF CORRECTION

PATENT NO. : 8,624,561 B1  
APPLICATION NO. : 12/940068  
DATED : January 7, 2014  
INVENTOR(S) : Keith Slavin Page 1 of 1

It is certified that error appears in the above-identified patent and that said Letters Patent is hereby corrected as shown below:

In the Claims

In claim 22, at col. 12, line 1, please replace "second" with --first--.

Signed and Sealed this
Twenty-second Day of September, 2015

Michelle K. Lee
*Director of the United States Patent and Trademark Office*